United States Patent [19]
Kelly

[11] Patent Number: 5,644,864
[45] Date of Patent: Jul. 8, 1997

[54] SAFETY FISHING POLE

[76] Inventor: Thomas Kelly, 70 Bourne St., Auburndale, Mass. 02166

[21] Appl. No.: 557,361

[22] Filed: Nov. 13, 1995

[51] Int. Cl.$^6$ .................................................. A01K 87/00
[52] U.S. Cl. .......................................................... 43/17.5
[58] Field of Search .................................. 43/17.5, 18.1, 43/25; 362/109

[56] References Cited

U.S. PATENT DOCUMENTS

| | | | |
|---|---|---|---|
| 2,565,633 | 8/1951 | Scott | 43/17.5 |
| 2,791,676 | 5/1957 | Cote | 43/17.5 |
| 2,805,508 | 9/1957 | Oldfield | 43/17.5 |
| 2,885,817 | 5/1959 | Carter | 43/25 |
| 4,026,059 | 5/1977 | Ochs | 43/17.5 |
| 4,775,920 | 10/1988 | Seifert et al. | 362/109 |
| 5,083,247 | 1/1992 | Robinson et al. | 362/109 |
| 5,172,508 | 12/1992 | Schmidt et al. | 43/18.1 |
| 5,179,797 | 1/1993 | Edwards | 43/25 |
| 5,182,873 | 2/1993 | Aragon, Jr. | 43/17 |
| 5,276,990 | 1/1994 | Ramirez | 43/17.5 |
| 5,347,741 | 9/1994 | Konrad | 43/17.5 |
| 5,566,493 | 10/1996 | Minorics | 43/17.5 |
| 5,586,403 | 12/1996 | Ward | 43/17.5 |

Primary Examiner—Kurt Rowan
Attorney, Agent, or Firm—Morse, Altman & Benson

[57] ABSTRACT

A fishing pole comprising: (a) a substantially hollow handle having a light transmissive portion near one extremity, a handle light source inside the handle that illuminates the light transmissive portion when energized, an electric power source, and a manually operated main electric switch; (b) a rod extending from the extremity of the handle adjacent to the light transmissive portion, the rod having a rod light source at the extremity of the rod remote from the handle; and (c) the main electric switch selectively energizing the handle light source and the rod light source from the electric power source. Preferably, the fishing pole includes a red light transmissive overlay mounted for longitudinal movement along the handle between an inactive position, where the overlay is not overlapping any part of the light transmissive portion, and an active position, where the overlay overlaps the light transmissive portion. Preferably the overlay controls a switch that, when inactive, causes any energized lamps to emit a steady light and, when active, causes the energized lamps to emit a pulsed light at a predetermined rate.

18 Claims, 3 Drawing Sheets

SAFETY FISHING POLE

BACKGROUND OF THE INVENTION

1. Field of the Invention

This invention relates to fishing poles, and more particularly, to fishing poles that are adapted to provide illumination and emergency signaling.

2. The Prior Art

There are a variety of U.S. patents whose subject matter is illuminated fishing poles. The purpose of these prior art fishing poles is to provide illumination for the person fishing during dusk, night, and dawn hours. A sample of illuminated fishing poles includes U.S. Pat. Nos. 5,347,741 issued to Konrad and 5,172,508 issued to Schmidt et al.

The typical illuminated pole has a hollow handle in which a lamp and power source is located and a transparent or translucent rod through which the light from the energized lamp is directed. In some poles, such as that of Konrad, the rod is illuminated by directing the light into the hollow center of the rod. In other poles, such as that of Schmidt, the rod is illuminated by directing the light into optical fibers of varying lengths that carry the light through the rod to various locations within the rod.

The illuminated fishing poles of the prior art are adequate if one only needs illumination to see what he or she is doing. Where they are deficient is in their ability to signal an emergency. Even with illumination at the tip of the rod, a white light can be mistaken for or be covered up by background light, especially if it is a steady light, rather than flashing.

Thus, there exists a need for a fishing pole that can be used to illuminate the work area and for signalling in the event of an emergency or to warn others.

SUMMARY OF THE INVENTION

An object of the present invention is to provide a fishing pole that can be used to signal others in the event of an emergency.

The safety fishing pole of the present invention comprises: (a) a substantially hollow handle having a light transmissive portion near a front extremity, a handle light source inside the handle that illuminates the light transmissive portion when energized, an electric power source, and a manually operated main electric switch; (b) a rod extending from the front extremity, the rod having a rod light source at the extremity of the rod remote from the handle; and (c) the main electric switch selectively energizing the handle light source and the rod light source from the electric power source.

The power source includes at least one electric cell that is located in a compartment at a rear extremity of the handle. The compartment is closed by a cap that is preferably composed of or coated with a fluorescent material. When the cap is installed, a substantially watertight seal is created.

The main electric switch has four operational states, an off state where the handle light source and the rod light source are both not energized, an illumination state where the handle light source is energized to emit a steady light and the rod light source is not energized, a signalling state where the handle light source is not energized and the rod light source is energized to emit a steady light, and a combination state where the handle light source and the rod light source are both energized to emit a steady light.

Preferably, the handle includes a red substantially transparent light transmissive overlay mounted for longitudinal movement along the handle between an inactive position and an active position. In the inactive position, the overlay is not overlapping any part of the light transmissive portion. In the active position, in one embodiment, the overlay substantially completely overlaps the light transmissive portion, and in another embodiment, the overlay overlaps the complete length and only part (preferably half) of the circumference of the light transmissive portion.

The handle includes an overlay electric switch that activates to change any energized light source from a steady light to a pulsed light at a predetermined rate when the overlay is in its active position. The overlay switch deactivates when the overlay is not in its active position.

The overlay inner surface includes a shallow annular groove and the outer surface of the handle includes two annular ridges that are adapted to mate with the overlay annular groove. The outer diameter of the annular ridges are larger than the diameter of the overlay inner surface so that there is friction between the handle and the overlay. One of the annular ridges is located such that when it is mated with the overlay annular groove, the overlay is in its inactive position. The other annular ridge is located such that when it is mated with the overlay annular groove, the overlay is in its active position.

Optionally, the handle includes a removable, fluorescent or reflective floatation sleeve.

The present invention overcomes the deficiencies of the prior art in part by providing a flashing red light at the tip of the rod. This light provides an easily visible signal to others that can be augmented by waving the rod back and forth. If the user should fall in the water, the tip of the rod can still be extended a considerable distance above the water providing a much greater chance of being seen. The waterproof seal on the power source compartment keeps the power source safe and available in the event of an emergency if the pole should happen to get wet.

By necessity, the light at the tip of the rod is small, but the light mounted in the handle can be much larger and brighter. The red overlay, when overlapping the light transmissive portion of the handle, provides a large red light for visibility in an emergency.

An additional advantage to the flashing light at the end of the rod is that it can be used to signal for help in situations that are not emergencies. For example, on a party fishing boat, where there are a large number of people fishing in close proximity to each other, a person can get the attention of one of the boat's assistants by energizing the flashing light.

Yet another advantage of the present invention is that if one lamp should burn out during an emergency, the safety fishing pole still provides illumination and signalling capability via the other lamp.

BRIEF DESCRIPTION OF THE DRAWINGS

For a fuller understanding of the nature and object of the present invention, reference is made to the accompanying drawings, wherein.

DETAILED DESCRIPTION

Figure 1:
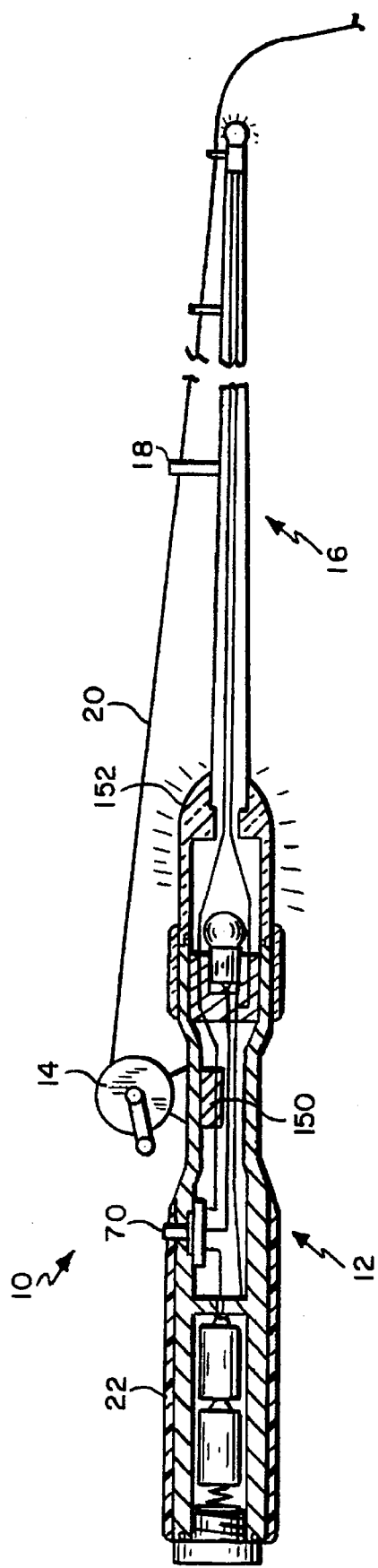
FIG. 1 shows a cross-sectional view of the fishing pole of the present invention.

The safety fishing pole of the present invention is shown in FIG. 1, and includes a handle 12, a reel 14, a rod 16, and two sources of illumination, a lamp 86 within the handle 12 and a lamp 114, 130 at the tip of the rod 16.

Preferably, the handle 12 is approximately cylindrical. The reel 14 is a conventional fishing reel and is conventionally mounted to the outside of the handle 12. Optionally, the handle 12 includes a removable, fluorescent or reflective floatation sleeve 22 that has sufficient buoyancy to float the safety fishing pole.

Figure 2:
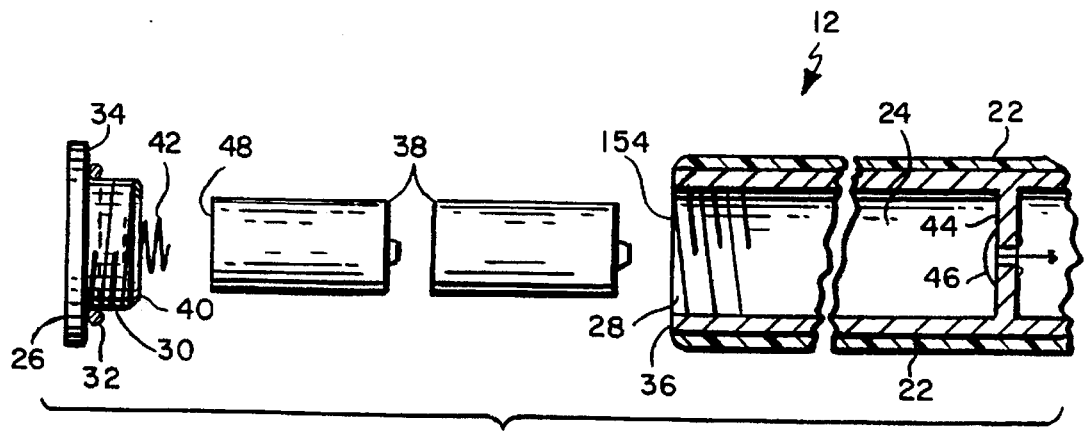
FIG. 2 shows a cross-sectional view of one embodiment of the rear of the rod handle.
Figure 3:
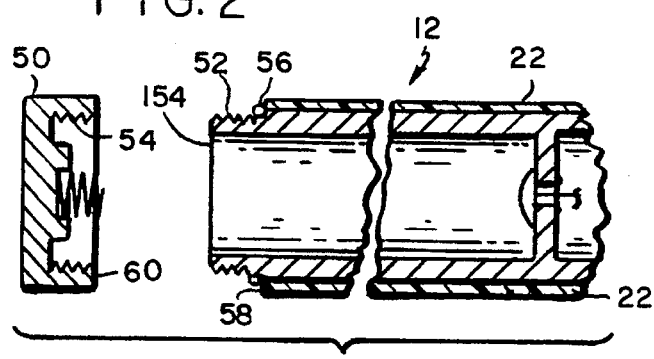
FIG. 3 shows a cross-sectional view of another embodiment of the rear of the rod handle.

Extending into the rear extremity 154 of the handle 12, as in FIG. 2, is a substantially cylindrical compartment 24. The compartment 24 is closed by an end cap 26, which is secured to the handle 12 by internal threads in the handle 28 and mating external threads on the cap 30. When the cap 26 is secured to the handle 12 via the mating threads 28, 30, a substantially watertight seal is created by compressing a rubber O-ring 32 between the shoulder of the cap 34 and the end surface of the handle 36. In an alternate embodiment, shown in FIG. 3, the cap 50 is secured to the handle 12 by external threads on the handle 52 and mating internal threads on the cap 54. A substantially watertight seal is created by compressing a rubber O-ring 56 between the shoulder of the handle 58 and the end surface of the cap 60.

Preferably, the cap 26, 50 includes a fluorescent material in its composition. In one embodiment, the fluorescent material is a coating, such as a fluorescent paint. In another embodiment, the material of which the cap 26, 50 is composed includes an imbedded fluorescent material, such as fluorescent flecks that are visible at the surface of the cap 26, 50.

Located within the compartment 24 is at least one electric power cell 38 forming the power source for the present invention 10. On the inner surface of the cap 40 is an electrically conductive spring 42 for pushing the cells together and to the inner wall of the compartment 44, and for making electrical contact with the rear electrode of the power cell 48. On the inner wall of the compartment 44 is an electrical contact 46 against which the cells 38 are pushed by the spring 42.

A main electric switch 70 is mounted in the handle 12 in front of the reel 14 so as not to interfere with the operation of the reel 14. Alternatively, the main electric switch 70 is mounted under the floatation sleeve. The main electric switch 70 is externally controllable in both configurations. The main electric switch 70 has four operational positions, as described below.

Figure 4:
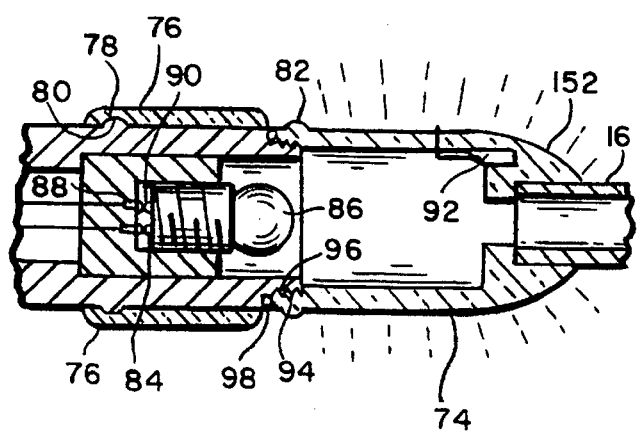
FIG. 4 shows a cross-sectional view of the front of the rod handle.

As seen in FIG. 4, the handle 12 has a light transmissive portion 74 at the front end. This portion 74 is preferably either clear transparent or clear translucent. The outer surface of the light transmissive portion 74 is contiguous with the adjacent outer surface of the handle 12. The light transmissive portion 74 is attached to the handle 12 by external threads on the handle 94 and mating internal threads on the handle lens 96. A watertight seal is created by compressing a rubber O-ring 98 between the shoulder of the handle 12 and the end surface of the light transmissive portion 74.

In one embodiment, a transparent or translucent overlay 76 that is preferably red in color encircles the handle 12 adjacent to the light transmissive portion 74. The overlay 76 is mounted for longitudinal movement along the handle 12 where, in its inactive position, shown in FIG. 4, it is not overlapping any part of the light transmissive portion 74 and, in its active position, it is substantially completely overlapping the light transmissive portion 74.

Figure 5:
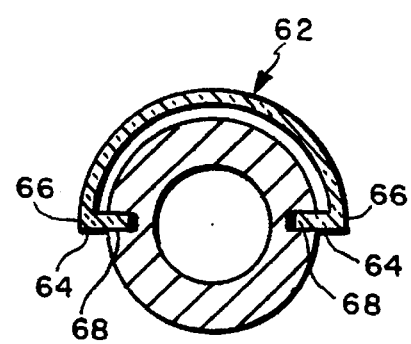
FIG. 5 shows an exaggerated end cross-sectional view of the second embodiment of the overlay.

In another embodiment, shown in FIG. 5, the red transparent overlay 62 only partially encircles the handle 12 adjacent to the light transmissive portion 74. Preferably, the overlay 62 encircles half of the circumference of the handle 12. The overlay 62 is mounted for longitudinal movement along the handle 12 where, in its inactive position, it is not overlapping any part of the light transmissive portion 74 and, in its active position, it overlaps a portion of the light transmissive portion 74. The overlay 62 is held to the handle 12 by longitudinal flanges 64 that extend inwardly from the long overlay edge 66, where the flanges 64 ride in longitudinal grooves 68 in the surface of the handle 12.

An additional embodiment contemplated by the present invention, but not shown, has a partially encircling first overlay attached to the handle as described above, but also includes a second overlay that removably attaches to the first overlay, where the combination of the two overlays completely encircles the handle. Thus, the light transmissive portion can be completely overlapped by the combination of the two overlays or partially overlaid by the first overlay, at the user's option.

The overlay 62, 76 is held in either the inactive position or active position by a shallow annular groove 78 in the inner surface of the overlay 62, 76 mating with one of two annular ridges 80, 82 on the surface of the handle 12. The inner diameter of the overlay 62, 76 is slightly smaller than the outer diameter of the ridges 80, 82 so that, as the overlay 62, 76 passes over the handle 12 surface, the annular ridges 80, 82 impart a small amount of friction to the inner surface of the overlay 62, 76 except when the annular groove 78 is coincident with one of the annular ridges 80, 82. The snap action of one of the annular ridges 80, 82 into the annular groove holds the overlay 62, 76 in position. When the overlay 62, 76 is in its active position, an overlay electric switch 92 is active, otherwise the overlay electric switch 92 is inactive. The function of the overlay electric switch 92 is described below.

Mounted inside the handle 12 in an electric socket 84 is a lamp 86. Preferably, the socket 84 is a screw or bayonet type socket. Two electrical contacts within the socket 88 mate with matching contacts on the handle lamp 90. The handle lamp 90 is accessed by unscrewing the light transmissive portion 74 from the rear portion of the handle 12 at the threads 94, 96.

As shown in FIG. 1, the rod 16 is an elongated member extending longitudinally from the front extremity 152 of the handle 12 and that tapers toward the tip away from the handle 100. The rod 16 has a plurality of line guides 18 mounted to its surface. The rod 16 may be solid or hollow and is preferably composed of fiberglass.

Figure 6:
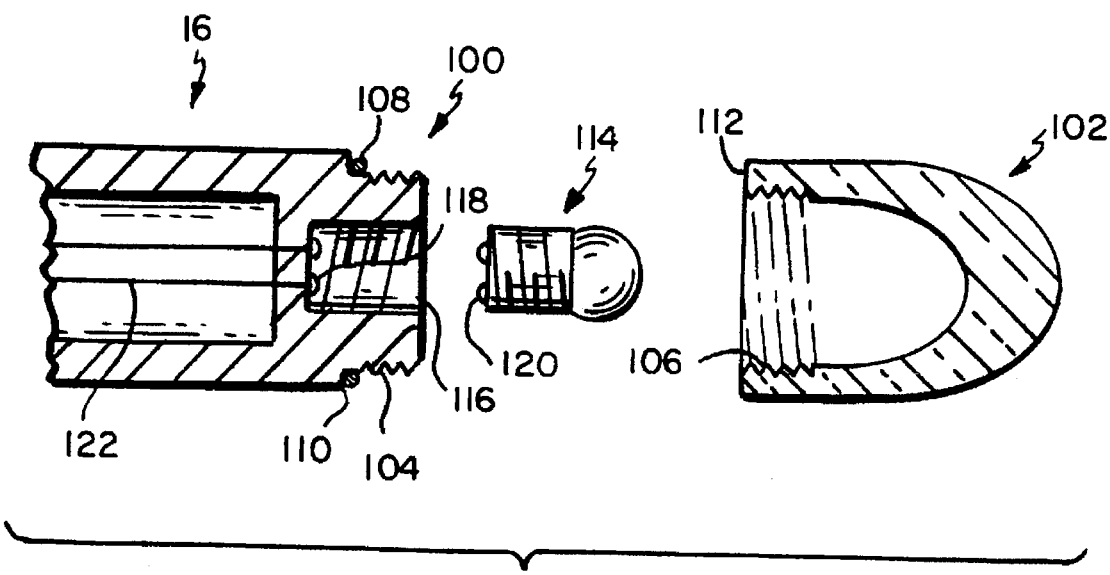
FIG. 6 shows an exploded cross-sectional view of one embodiment of the tip of the rod.

As shown in FIG. 6, attached to the rod tip 100 is a red transparent or translucent lens 102. Preferably, the rod lens 102 is attached to the tip 100 by external threads on the rod surface 104 and mating internal threads in the rod lens 106. When the rod lens 102 is attached via the threads 104, 106 to the rod tip 100, a substantially watertight seal is created by compressing a rubber O-ring 108 between the shoulder of the rod 110 and the end surface of the rod lens 112.

A lamp 114 is located at the rod tip 100. Formed or fitted into an opening on the rod tip 100 is an electric socket 116 into which the rod lamp 114 attaches. The socket 116 is preferably a screw or a bayonet type socket. Two electrical contacts within the socket 118 mate with matching contacts on the rod lamp 120. If the rod 16 is hollow, two electric wires 122 that are electrically connected to the socket contacts 118 extend through the hollow to the handle 12. If the rod 16 is solid, two electric conductors electrically connected to the socket contacts 118 are embedded in the rod 16 from the socket 116 to the handle 12.

Figure 7:
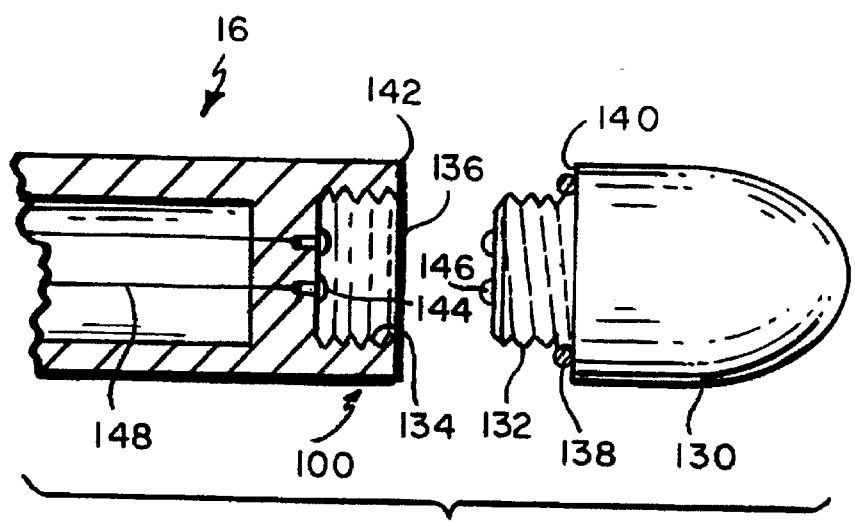
FIG. 7 shows an exploded cross-sectional view of another embodiment of the tip of the rod.

In an alternate embodiment, shown in FIG. 7, there is no separate lens; the rod lamp 130 is mounted at the rod tip 100. The rod lamp 130 has external threads 132 that mate with the internal threads 134 of a socket 136 that is formed in or fitted into the rod tip 100. When the rod lamp 130 is mounted into the socket 136, a substantially watertight seal is created by compressing a rubber O-ring 138 between the shoulder of the rod lamp 140 and the end surface of the rod tip 142. Two electrical contacts within the socket 144 mate with matching contacts on the rod lamp 146. If the rod 16 is hollow, two electric wires 148 that are electrically connected to the socket contacts 144 extend through the hollow to the handle 12. If the rod 16 is solid, two electric conductors electrically connected to the socket contacts 144 are embedded in the rod 16 from the socket 136 to the handle 12.

Figure 8:
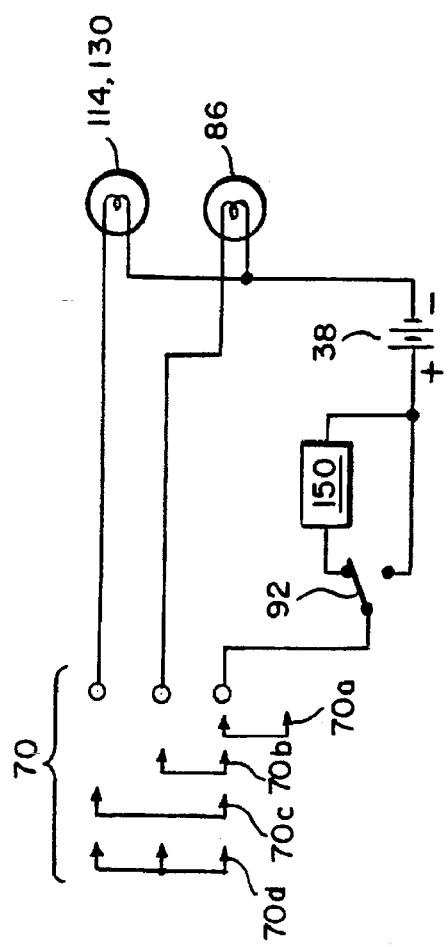
FIG. 8 shows an electrical diagram of the present invention.

An electrical diagram of the present invention 10 is shown in FIG. 8. The power cells 38 are connected to the circuit through the spring 42 on the cap 26, 50 and through the electrical contact 46 at the inner extremity of the handle compartment 24.

The main electric switch 70 has four operational positions or states. In the first position 70a, the off state, both the handle lamp 86 and the rod lamp 114, 130 are deenergized. In the second position 70b, the illumination state, the handle lamp 86 is energized and the rod lamp 114, 130 is deenergized. In the third position 70c, the signalling state, the handle lamp 86 is deenergized and the rod lamp 114, 130 is energized. In the fourth position 70d, the combination state, both the handle lamp 86 and the rod lamp 114, 130 are energized.

When the overlay electric switch 92 is inactive, any energized lamp emits a steady light. When the overlay switch 92 is active, a flasher module 150 is switched into series with the power cells 38. This causes any energized lamp to emit pulses of light at a predetermined rate. The pulse rate is preferably between 1 and 5 times per second. The flasher module 150 is located within the handle 12.

OPERATION

The safety fishing pole of the present invention 10 is, for the most part, used in the same manner as any standard fishing pole. The reel 14 is attached to the handle 12 and the line 20 is strung through the line guides 18.

Power is supplied to the handle lamp 86 and rod lamp 114, 130 but electric cells 38 installed in a compartment 24 in the end of the handle 12. The compartment 24 is accessed by unscrewing the cap 34, 50 from the handle 12. The cells 38 are installed sequentially into the compartment 24 and the cap 34, 50 is reinstalled by screwing it back onto the handle 12.

If the handle lamp 86 needs to be replaced, the light transmissive portion 74 is unscrewed from the handle 12, the handle lamp 86 is removed from the handle socket 84, a new handle lamp 86 is installed in the handle socket 84, and the light transmissive portion 74 is screwed back onto the handle 12. If the rod lamp 114 of the first embodiment needs to be replaced, the lens 102 is unscrewed from the rod tip 100, the rod lamp 114 is removed from the rod socket 116, a new rod lamp 114 is installed in the rod socket 116, and the lens 102 is screwed back onto the rod tip 100. If the rod lamp 130 if the second embodiment needs to be replaced, it is removed from the rod socket 136 and a new rod lamp 130 is installed in the rod socket 136.

When the person using the safety fishing pole needs illumination, he or she can move the main switch 70 from the off state to the illumination, signalling, or combination state. This energizes either the handle lamp 86 only or the handle lamp 86 and the rod lamp 114, 130 to emit a steady light. In any state, moving the overlay 62, 76 from its inactive position to its active position causes any energized lamp to emit pulses of light at a predetermined rate.

What is claimed is:

1. A fishing pole comprising:
   (a) a substantially hollow handle having an outer surface, a front extremity, and a rear extremity;
   (b) said handle having a light transmissive portion adjacent to said front extremity, said light transmissive portion having an outer surface;
   (c) said handle having a handle light source inside said handle that illuminates said light transmissive portion when energized, an electric power source, and a manually operated main electric switch;
   (d) a rod extending from said front extremity, said rod having a rod light source at the extremity of said rod remote from said handle;
   (e) said main electric switch selectively energizing said handle light source and said rod light source from said electric power source; and
   (f) said handle including a rigid, light transmissive overlay having an inner surface adjacent to said handle outer surface and being mounted for longitudinal movement along said handle outer surface between an inactive position, where said overlay is not overlapping any part of said light transmissive portion outer surface, and an active position, where said overlay overlaps at least a part of said light transmissive portion outer surface.

2. The fishing pole of claim 1 wherein said light transmissive portion is clear and substantially transparent.

3. The fishing pole of claim 1 wherein said main electric switch has four operational states, an off state being when said handle light source and said rod light source are not energized, an illumination state being when said handle light source is energized and said rod light source is not energized, a signalling state being when said handle light source is not energized and said rod light source is energized, and a combination state being when said handle light source and said rod light source are energized.

4. The fishing pole of claim 1 wherein said overlay is red and substantially transparent.

5. The fishing pole of claim 1 wherein said overlay overlaps substantially all of said light transmissive portion outer surface when in said active position.

6. The fishing pole of claim 1 wherein said handle includes an overlay electric switch, said overlay electric switch having two operational states, a steady state being when said overlay is in said inactive position and a pulse state being when said overlay is in said active position, said handle light source and said rod light source emitting a steady light when energized and said overlay switch is in said steady state, said handle light source and said rod light source emitting a pulsed light at a predetermined rate when energized and said overlay switch is in said pulse state.

7. The fishing pole of claim 1 wherein said power source includes at least one electric cell located in a compartment at said second extremity of said handle, said compartment opening at said second extremity and being closed by a cap, said cap closure being substantially watertight.

8. The fishing pole of claim 1 wherein said handle includes a sleeve that has sufficient buoyancy to float said safety fishing pole in water.

9. The fishing pole of claim 8 wherein said sleeve is removable.

10. The fishing pole of claim 8 wherein said sleeve is fluorescent.

11. A fishing pole comprising:

(a) a substantially hollow handle having an outer surface, a front extremity, and a rear extremity;

(b) said handle having a clear and substantially transparent light transmissive portion adjacent to said front extremity, said light transmissive portion having an outer surface;

(c) said handle having a handle light source inside said handle that illuminates said light transmissive portion when energized, an electric power source, and a manually operated main electric switch;

(d) said handle including a red, substantially transparent, rigid, light transmissive overlay having an inner surface adjacent to said handle outer surface and being mounted for longitudinal movement along said handle outer surface between an inactive position, where said overlay is not overlapping any part of said light transmissive portion outer surface, and an active position, where said overlay overlaps at least a part of said light transmissive portion outer surface;

(e) said power source including at least one electric cell located in a compartment at said rear extremity of said handle, said compartment opening at said rear extremity and being closed by a cap, said cap closure being substantially watertight;

(f) a rod extending from said front extremity, said rod having a rod light source at the extremity of said rod remote from said handle; and (g) said main electric switch selectively energizing said handle light source and said rod light source from said electric power source, said main electric switch having four operational states, an off state being when said handle light source and said rod light source are not energized, an illumination state being when said handle light source is energized and said rod light source is not energized, a signaling state being when said handle light source is not energized and said rod light source is energized, and a combination state being when said handle light source and said rod light source are energized.

12. The fishing pole of claim 11 wherein said overlay overlaps substantially all of said light transmissive portion outer surface when in said active position.

13. The fishing pole of claim 11 wherein said handle includes an overlay electric switch, said overlay electric switch having two operational states, a steady state being when said overlay is in said inactive position and a pulse state being when said overlay is in said active position, said handle light source and said rod light source emitting a steady light when energized and said overlay switch is in said steady state, said handle light source and said rod light source emitting a pulsed light at a predetermined rate when energized and said overlay switch is in said pulse state.

14. The fishing pole of claim 11 wherein said handle includes a sleeve that has sufficient buoyancy to float said safety fishing pole in water.

15. The fishing pole of claim 14 wherein said sleeve is removable.

16. The fishing pole of claim 14 wherein said sleeve is fluorescent.

17. A fishing pole comprising:

(a) a substantially hollow handle having an outer surface, a front extremity, and a rear extremity;

(b) said handle including a removable, fluorescent sleeve that has sufficient buoyancy to float said safety fishing pole in water;

(c) said handle having a clear and substantially transparent light transmissive portion adjacent to said front extremity, said light transmissive portion having an outer surface;

(d) said handle having a handle light source inside said handle that illuminates said light transmissive portion when energized, an electric power source, and a manually operated main electric switch;

(e) said handle including a red, substantially transparent, rigid, light transmissive overlay having an inner surface adjacent to said handle outer surface and being mounted for longitudinal movement along said handle outer surface between an inactive position, where said overlay is not overlapping any part of said light transmissive portion outer surface, and an active position, where said overlay overlaps at least a part of said light transmissive portion outer surface;

(f) said power source including at least one electric cell located in a compartment at said rear extremity of said handle, said compartment opening at said rear extremity and being closed by a cap, said cap closure being substantially watertight;

(g) a rod extending from said front extremity, said rod having a rod light source at the extremity of said rod remote from said handle;

(h) said main electric switch selectively energizing said handle light source and said rod light source from said electric power source, said main electric switch having four operational states, an off state being when said handle light source and said rod light source are not energized, an illumination state being when said handle light source is energized and said rod light source is not energized, a signaling state being when said handle light source is not energized and said rod light source is energized, and a combination state being when said handle light source and said rod light source are energized; and (i) said handle including an overlay electric switch, said overlay electric switch having two operational states, a steady state being when said overlay is in said inactive position and a pulse state being when said overlay is in said active position, said handle light source and said rod light source emitting a steady light when energized and said overlay switch is in said steady state, said handle light source and said rod light source emitting a pulsed light at a predetermined rate when energized and said overlay switch is in said pulse state.

18. The fishing pole of claim 17 wherein said overlay overlaps substantially all of said light transmissive portion outer surface when in said active position.

* * * * *